United States Patent
Qiang et al.

(10) Patent No.: US 9,978,417 B1
(45) Date of Patent: May 22, 2018

(54) SHINGLED MAGNETIC RECORDING STORAGE SYSTEM IMPROVING COMMAND COMPLETION TIME

(71) Applicant: Seagate Technology LLC, Cupertino, CA (US)

(72) Inventors: Jian Qiang, Singapore (SG);
HiauChoon Kee, Singapore (SG);
QuekLeong Choo, Singapore (SG);
Choon Wei Ng, Singapore (SG);
WenXiang Xie, Singapore (SG)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days. days.

(21) Appl. No.: 15/583,727

(22) Filed: May 1, 2017

(51) Int. Cl.
| | |
|---|---|
| *G11B 5/09* | (2006.01) |
| *G11B 20/12* | (2006.01) |
| *G11B 5/55* | (2006.01) |
| *G11B 5/49* | (2006.01) |
| *G11B 5/012* | (2006.01) |
| *G11B 27/36* | (2006.01) |

(52) U.S. Cl.
CPC ........ *G11B 20/1217* (2013.01); *G11B 5/5521* (2013.01); *G11B 5/012* (2013.01); *G11B 5/09* (2013.01); *G11B 5/4907* (2013.01); *G11B 27/36* (2013.01); *G11B 2020/1238* (2013.01)

(58) Field of Classification Search
None
See application file for complete search history.

(56) References Cited

U.S. PATENT DOCUMENTS

| | | | |
|---|---|---|---|
| 9,099,155 B1* | 8/2015 | Kataria | G11B 27/36 |
| 9,236,087 B1* | 1/2016 | Dahlberg | G11B 21/02 |
| 9,324,362 B1 | 4/2016 | Gao et al. | |
| 9,378,763 B1 | 6/2016 | Kim et al. | |
| 9,437,240 B1* | 9/2016 | Haddock | G11B 20/10212 |
| 9,524,743 B2 | 12/2016 | Zhu et al. | |
| 2012/0176698 A1* | 7/2012 | Rub | G11B 5/012 360/31 |
| 2013/0027800 A1* | 1/2013 | Park | G11B 5/012 360/31 |
| 2014/0139940 A1* | 5/2014 | Ong | G11B 5/012 360/39 |
| 2016/0034342 A1* | 2/2016 | Toh | G06F 11/1044 714/721 |

(Continued)

*Primary Examiner* — Tan X Dinh
(74) *Attorney, Agent, or Firm* — Holzer Patel Drennan

(57) ABSTRACT

The disclosed technology provides a system and method that improves command completion time in a shingled magnetic recording device system. In one implementation, the system and method include receiving a write command to write data to a first track in a band in a recording medium, seeking to a first track, reducing an on-cylinder limit (OCLIM) from a default OCLIM to a reduced OCLIM by a predetermined amount on the first track, performing write operations on the first track with the reduced OCLIM, and determining if a transfer of data to the first track band in the write operations has been substantially completed. Upon determining that a transfer of data to the first track in the write operations has been substantially completed, the OCLIM is restored from a reduced OCLIM to a default OCLIM and write operations are performed on tracks adjacent to the first track.

20 Claims, 4 Drawing Sheets

(56) References Cited

U.S. PATENT DOCUMENTS

2016/0148635 A1\* 5/2016 Zhu ..................... G11B 7/1263
                                                        369/13.26
2016/0148644 A1   5/2016 Zhu et al.
2016/0372143 A1\* 12/2016 Qiang ..................... G11B 5/56

\* cited by examiner

SHINGLED MAGNETIC RECORDING STORAGE SYSTEM IMPROVING COMMAND COMPLETION TIME

BACKGROUND

As requirements for data storage density increase for magnetic media, cell size decreases. A commensurate decrease in the size of a write element is difficult because in many systems, a strong write field gradient is needed to shift the polarity of cells on a magnetized medium. As a result, writing data to smaller cells on the magnetized medium using the relatively larger write pole may affect the polarization of adjacent cells (e.g., overwriting the adjacent cells). One technique for adapting the magnetic medium to utilize smaller cells while preventing adjacent data from being overwritten during a write operation is shingled magnetic recording (SMR).

SMR allows for increased areal density capability (ADC) as compared to conventional magnetic recording (CMR) but at the cost of some performance ability. As used herein, CMR refers to a system that allows for random data writes to available cells anywhere on a magnetic media. In contrast to CMR systems, SMR systems are designed to utilize a write element with a write width that is larger than a defined track pitch. As a result, changing a single data cell within a data track entails re-writing a corresponding group of shingled (e.g., sequentially increasing or decreasing) data tracks.

SUMMARY

The disclosed technology provides a system and method that improves command completion time in a shingled magnetic recording device system. In one implementation, the system and method include receiving a write command to write data to a first track in a band in a recording medium, seeking to a first track in the band, reducing an on-cylinder limit (OCLIM) from a default OCLIM to a reduced OCLIM by a predetermined amount on the first track, performing write operations on the first track with the reduced OCLIM, and determining if a transfer of data to the first track band in the write operations has been substantially completed. Upon determining that a transfer of data to the first track band in the write operations has been substantially completed, the OCLIM is restored from a reduced OCLIM to a default OCLIM and write operations are performed on tracks adjacent to the first track.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
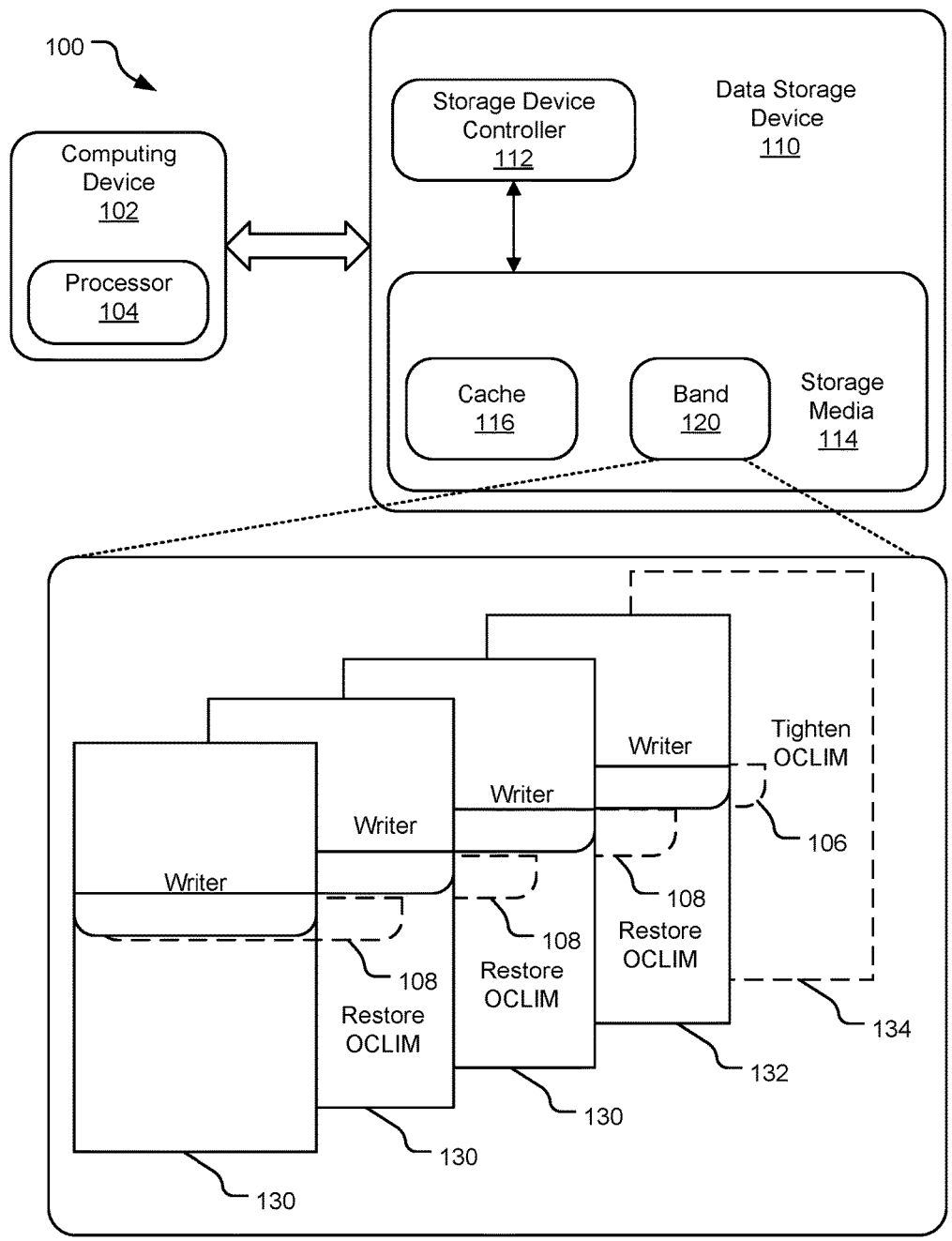
FIG. 1 is a block diagram of an example data storage system.

The present disclosure is directed to data storage systems that improve command completion time (CCT) by reducing adjacent track interference (ATI) in a shingled magnetic recording (SMR) drive. The disclosed technology includes a system and method of dynamically tightening an on-cylinder limit (OCLIM) of a disc drive in a data storage system during a write transfer at a starting (or first) track during a write transfer, and restoring the OCLIM at shingled tracks adjacent to the starting track. The OCLIM may be defined as the off-track limit. A default value of OCLIM is determined during storage drive design. When a writer position from the track center (position error signals) is greater than an OCLIM, the writing operation may be stopped. In some implementations, the range of OCLIM is approximately 7-14% track pitch. In some implementations, the unit of OCLIM may be a minch. For example, 0.1 minch.

An SMR drive is a storage device that uses bands of overlapping tracks to increase storage density. In SMR, a new track may be written that partially overlaps a previously written track, creating a shingled aspect to the tracks. SMR leverages the fact that a width of a read head is typically narrower than the width of a write head. The storage density of an SMR drive is increased over conventional drives because the previously written tracks are thinner, allowing for higher track density. In an SMR drive, a set of bands of overlapping tracks may be separated by an isolation space, which serves to reduce the number of tracks that need to be rewritten when a shingled track is rewritten.

The technology disclosed herein can be used with various data storage devices. Examples of such data storage devices include hard disc drives, solid state hybrid drives, solid state media such as NAND, NVRAM, Resistive RAM (ReRAM), Magnetic RAM (MRAM), Phase Change Memory (PCM), and other memory technologies.

In the following description, reference is made to the accompanying drawing that forms a part hereof and in which are shown by way of illustration at least one specific embodiment. In the drawing, like reference numerals are used throughout several figures to refer to similar components. In some instances, a reference numeral may have an associated sub-label consisting of a lower-case letter to denote one of multiple similar components. When reference is made to a reference numeral without specification of a sub-label, the reference is intended to refer to all such multiple similar components.

FIG. 1 illustrates a block diagram of an example data storage system 100, showing various functional components used to control the operation of a data storage device 110 (e.g., an SMR HDD, an SMR SSHD, an object storage device, etc.).

The data storage system 100 includes a computing or computing device 102 (e.g., a computer, a mobile device, the internet, etc.) operably connected to the data storage device 110, each of the computing device 102 and the data storage device 110 communicating with each other.

A processor 104 is located in the computing device 102. The processor 104 sends one or more read or write commands to a storage device controller 112 for execution. As control communication paths are provided between the computing device 102 and the storage device controller 112, the storage device controller 112 provides communication and control for the data storage device 110.

Storage media 114 located in the data storage device 110 may be one or more of a variety of tangible media (excluding carrier waves and communication signals), including hard disk drives and solid state hybrid drives, store data on magnetic media, as well as optical media, solid state media such as NAND, NVRAM, Resistive RAM (ReRAM), Magnetic RAM (MRAM), Phase Change Memory (PCM), and other advanced and staid memory technologies.

The data storage device 110 further includes a non-volatile cache 116 that is either a storage area on the storage media 114 or another non-volatile memory accessible by the data storage device 110. In the depicted system 100, the cache 116 is a storage area on the storage media 114.

A band 120 of shingled tracks (e.g., track 130) may also be located in the storage media 114. In FIG. 1, the shingled tracks 130 are located in the band 120 are shown. An implementation of the shingled tracks 130 is arranged such that when data is written to one of the shingled tracks 130 (except for the last data track), a writing operation affects data on an adjacent track in a down-track direction.

On a band-based SMR drive, partial band writing or writing from the middle of a band may introduce more ATI due to a higher track per inch (TPI). In shingled recording, only one side of an adjacent track may be affected. In the case of a direct off-line scan (DOS) operation, a background ATI repair scheme based on write count, a scan of a data track after a particular number of data writes to an immediately adjacent or near data track. A DOS operation records the write count to physical tracks and starts a background scan/refresh operation to recover the tracks that have been encroached by adjacent track interference (ATI). A DOS operation measures the track degradation by write count. The higher the write count, the more encroachment is determined. In SMR implementations, a track repair process may read and rewrite full/partial band range even if only one track requires repair, which may introduce a much longer CCT and significant processing overhead. A DOS operation may impact user command completion time. In certain disc aggressive applications, such as surveillance or multiple video streaming, a long CCT can interrupt the media streaming and user experience may be affected. In surveillance, for example, security gaps may arise. Tightening OCLIM can reduce ATI, thereby reducing DOS activity. However, extra disc retry can be introduced if write OCLIM is tightening, which eventually affects a drive throughput.

In band basis recording, only a starting track (e.g., track 134) will create unrecoverable disk error (UDE) on an adjacent track (e.g., track 132) in front of it. The following tracks (e.g., tracks 130) will not affected by ATI because the following tracks are to be overwritten or rewritten through band updating operation. The disclosed technology includes tightening an OCLIM at the starting track 134 only during band updating, so that the ATI can be mitigated, and the majority of disc write will not impacted. In some implementations, the OCLIM may be tightened by approximately 2% at the first track 134 of transfer, resulting in approximately 50% reduction of background DOS work, which is visible improvement for CCT.

The disclosed disc write scheme dynamically tightens an OCLIM through servo command before starting transfer on the first track 134, by reducing a default OCLIM (e.g., default OCLIM 108) to a reduced OCLIM (e.g., reduced OCLIM 106), and then restores OCLIM to a normal limit (default OCLIM 108) before transferring on the following tracks (e.g., track 132, tracks 130). As a result, the ATI risk in an SMR drive can be mitigated and also throughput at a high level. With a reduced DOS workload, long CCT occurrence will be reduced, which will eventually improve overall user experience, particularly in multimedia streaming and surveillance.

Figure 2:
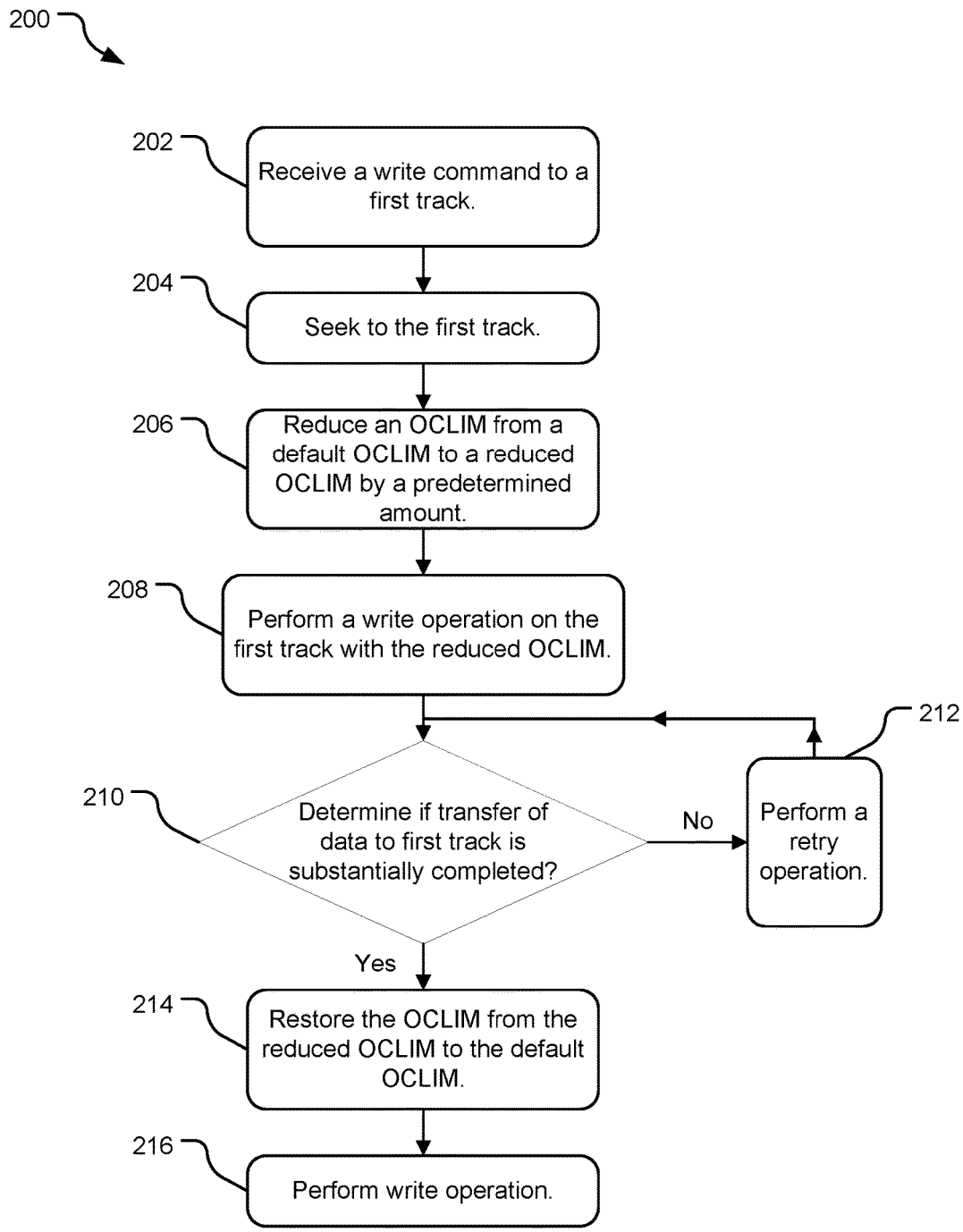
FIG. 2 is a flowchart of example operations for reducing command completion time in a shingled magnetic recording storage system.

FIG. 2 is a flowchart of example operations 200 for reducing command completion time in a shingled magnetic recording storage system. An operation 202 receives a write command for a storage controller to write data to a first track in a band in a recording medium. In some implementations, the recording medium is an SMR medium.

An operation 204 seeks to the first track in the band of the recording medium. An operation 206 reduces an OCLIM from a default OCLIM to a reduced OCLIM by a predetermined amount on the first track via servo command. The predetermined amount may be a predefined percentage of the nominal trach pitch for the disc drive. For example, the predetermined amount may be approximately 2%.

An operation 208 performs write operations on the first track with the reduced OCLIM. An operation 210 determines if a transfer of data to the first track in the write operations has been substantially completed. If operation 210 determines that a transfer of data to the first track in the write operations has been substantially completed, an operation 214 restores the OCLIM from a reduced OCLIM to a default OCLIM. An operation 216 performs write operations on tracks adjacent to the first track.

If operation 210 determines that a transfer of data to the first track in the write operations has not been completed, an operation 212 performs a retry operation until the transfer of data to the first track has been completed. The operation 212 performs the retry operation, and operation 210 will occur again and determine if a transfer of data to the first track in the write operations has been substantially completed. If operation 210 determines the transfer of data to the first track in the write operations has not been substantially completed, then operation 212, and operation 210 occur again until write operations have been substantially completed. Once write operations have been substantially completed, operations 214 and 216 may occur, as described above.

Figure 3:
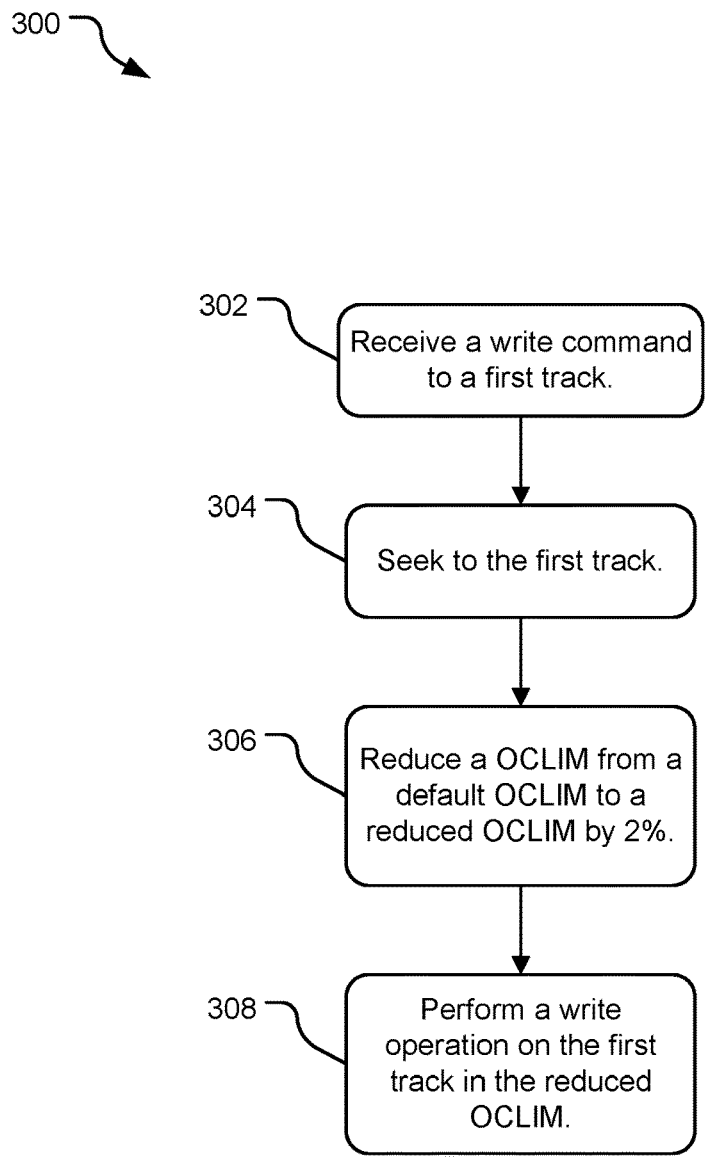
FIG. 3 is a flowchart of example operations for reducing command completion time in a shingled magnetic recording.

FIG. 3 is a flowchart of example operations 300 for reducing command completion time in a shingled magnetic recording storage system. An operation 302 receives a write command to write data to a first track in a band in a recording medium. An operation 304 seeks to the first track in the band. An operation 306 reduces an OCLIM from a default OCLIM to a reduced OCLIM by 2% on the first track via a servo command. An operation 208 performs write operations on the first track with the reduced OCLIM. As a result, CCT is improved in an SMR drive by reduction of background DOS media repair activities, the SMR drive lifespan is improved due to reduction of media read/write, and user experience is improved (e.g., non-interrupted media streaming).

Figure 4:
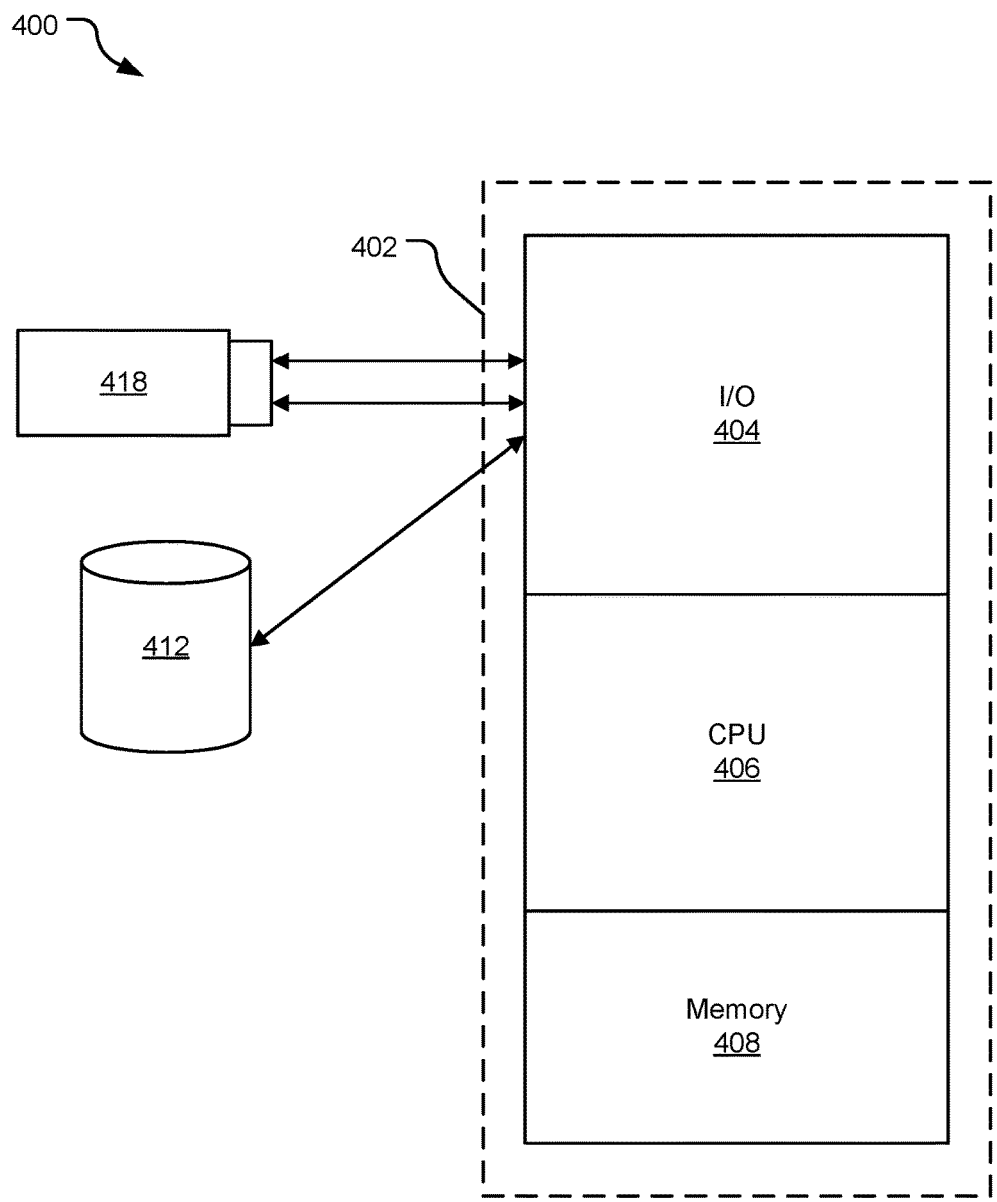
FIG. 4 is a block diagram of an example computer system suitable for implementing the technology disclosed herein.

FIG. 4 discloses a block diagram of a computer system 400 suitable for implementing operations for reducing command completion time in a shingled magnetic recording storage system. Computer system 400 is capable of executing a computer program product embodied in a tangible computer-readable storage medium to execute a computer process. The tangible computer-readable storage medium is not embodied in a carrier-wave or other signal. Data and program files may be input to computer system 400, which reads the files and executes the programs therein using one or more processors. Some of the elements of a computer system are shown in FIG. 4, where a processor 402 is shown having an input/output (I/O) section 404, a Central Processing Unit (CPU) 406, and a memory 408. There may be one or more processors 402, such that processor 402 of system 400 has a single central-processing unit or a plurality of processing units. System 400 further incudes a controller, not shown in FIG. 4, configured to designate a plurality of non-contiguous storage areas on the storage media as media scratch pads; the controller may be software, firmware, or a combination thereof. System 400 may be a conventional computer, a distributed computer, or any other type of computer. The described technology is optionally implemented in software loaded in memory 408, a disc storage unit 412, or removable memory 418.

In an example implementation, the disclosed process of reducing CCT in SMR may be embodied by instructions stored in memory 408 and/or disc storage unit 412 and executed by CPU 406. Further, local computing system, remote data sources and/or services, and other associated logic represent firmware, hardware, and/or software which may be configured to adaptively distribute workload tasks to improve system performance. The use of the media scratch pad may be implemented using a general purpose computer and specialized software (such as a server executing service software), and a special purpose computing system and specialized software (such as a mobile device or network appliance executing service software), or other computing configurations. In addition, program data, such as dynamic allocation threshold requirements and other information may be stored in memory 408 and/or disc storage unit 412 and executed by processor 402.

The implementations of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, adding and omitting as desired, unless explicitly claimed otherwise or a specific order is inherently necessitated by the claim language.

The above specification, examples, and data provide a complete description of the structure and use of exemplary embodiments of the invention. The above description provides specific embodiments. It is to be understood that other embodiments are contemplated and may be made without departing from the scope or spirit of the present disclosure. The above detailed description, therefore, is not to be taken in a limiting sense. While the present disclosure is not so limited, an appreciation of various aspects of the disclosure will be gained through a discussion of the examples provided.

Unless otherwise indicated, all numbers expressing feature sizes, amounts, and physical properties are to be understood as being modified by the term "about." Accordingly, unless indicated to the contrary, the numerical parameters set forth are approximations that can vary depending upon the desired properties sought to be obtained by those skilled in the art utilizing the teachings disclosed herein.

As used herein, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

Spatially related terms, including but not limited to, "lower", "upper", "beneath", "below", "above", "on top", etc., if used herein, are utilized for ease of description to describe spatial relationships of an element(s) to another. Such spatially related terms encompass different orientations of the device in addition to the particular orientations depicted in the figures and described herein. For example, if a structure depicted in the figures is turned over or flipped over, portions previously described as below or beneath other elements would then be above or over those other elements.

Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
receiving a write command to write data to a first track in a band in a recording medium;
seeking to the first track in the band;
reducing an on-cylinder limit (OCLIM) from a default OCLIM to a reduced OCLIM on the first track in the band by a predetermined amount; and
performing write operations on the first track with the reduced OCLIM.

2. The method of claim 1, wherein the predetermined amount is approximately 2%.

3. The method of claim 1, wherein the recording medium is shingled magnetic recording medium.

4. The method of claim 1, further comprising:
determining if a transfer of data to the first track in the write operations has been substantially completed.

5. The method of claim 4, further comprising:
restoring the OCLIM from a reduced OCLIM to a default OCLIM responsive to determining that a transfer of data to the first track band in the write operations has been substantially completed; and
performing write operations on tracks adjacent to the first track.

6. The method of claim 4, further comprising:
performing a retry operation responsive to determining a transfer of data to the first track in the write operations has not been completed;
reducing the OCLIM from a default limit to a reduced limit; and
determining if a transfer of data to the first track in the write operations has been substantially completed.

7. The method of claim 6, further comprising:
restoring the OCLIM from the reduced limit to the default limit responsive to determining a transfer of data to the first track band in the write operations has been substantially completed; and
performing a write operation on tracks adjacent to the first track.

8. A storage device system, comprising:
a storage controller configured to:
receive a write command to write data to a first track in a band in a recording medium;
seek to a first track in the band;
reduce an on-cylinder limit (OCLIM) from a default OCLIM to a reduced OCLIM on the first track in the band by a predetermined amount; and
perform write operations on the first track in the band with the reduced OCLIM.

9. The storage device system of claim 8, wherein the recording medium is shingled magnetic recording medium.

10. The storage device system of claim 8, wherein the predetermined amount is approximately 2%.

11. The storage device system of claim 8, wherein the storage controller is further configured to:
   determine if a transfer of data to the first track in the band in the write operations has been substantially completed.

12. The storage device system of claim 11, wherein the storage controller is further configured to:
   restore the OCLIM from a reduced OCLIM to a default OCLIM responsive to determining that a transfer of data to the first track in the band in the write operations has been substantially completed; and
   perform write operations on tracks adjacent to the first track in the band.

13. The storage device system of claim 8, wherein the storage controller is further configured to:
   perform a retry operation responsive to determining a transfer of data to the first track in the band in the write operations has not been completed;
   reduce the OCLIM to a reduced limit; and
   determine if a transfer of data to the first track in the band in the write operations has been substantially completed.

14. The storage device system of claim 13, wherein the storage controller is further configured to:
   restore the default OCLIM on tracks adjacent to the first track in the band responsive to determining that a transfer of data to the first track in the band in the write operations has been substantially completed; and
   perform a write operation on tracks adjacent to the first track in the band.

15. One or more non-transitory computer-readable storage media encoding computer-executable instructions for executing on a computer system a computer process, the computer process comprising:
   receiving a write command to write data to a first track in a band in a recording medium;
   seeking to a first track in the band;
   reducing an on-cylinder limit (OCLIM) from a default OCLIM to a reduced OCLIM on the first track in the band by a predetermined amount; and
   performing write operations on the first track in the band with the reduced OCLIM.

16. The one or more non-transitory computer-readable storage media of claim 15, further comprising:
   determining if a transfer of data to the first track in the band in the write operations has been substantially completed.

17. The one or more non-transitory computer-readable storage media of claim 16, further comprising:
   restoring the OCLIM from a reduced OCLIM to a default OCLIM responsive to determining that a transfer of data to the first track in the band in the write operations has been substantially completed; and
   performing write operations on tracks adjacent to the first track in the band.

18. The one or more non-transitory computer-readable storage media of claim 16, further comprising:
   performing a retry operation responsive to determining a transfer of data to the first track in the band in the write operations has not been completed;
   reducing the OCLIM from a default limit to a reduced limit; and
   determining if a transfer of data to the first track in the band in the write operations has been substantially completed.

19. The one or more non-transitory computer-readable storage media of claim 18, further comprising:
   restoring the OCLIM from a reduced limit to a default limit responsive to determining a transfer of data to the first track in the band in the write operations has been substantially completed; and
   performing a write operation on tracks adjacent to the first track in the band.

20. The one or more non-transitory computer-readable storage media of claim 15, wherein the recording medium is shingled magnetic recording medium.

* * * * *